Nov. 21, 1967  O. J. B. ORWIN  3,353,500

CONVEYORS FOR CONVEYING GOODS

Filed June 7, 1965  6 Sheets-Sheet 1

INVENTOR
OLAF JOHN BARCLAY ORWIN
BY Kurt Kelman
Agent

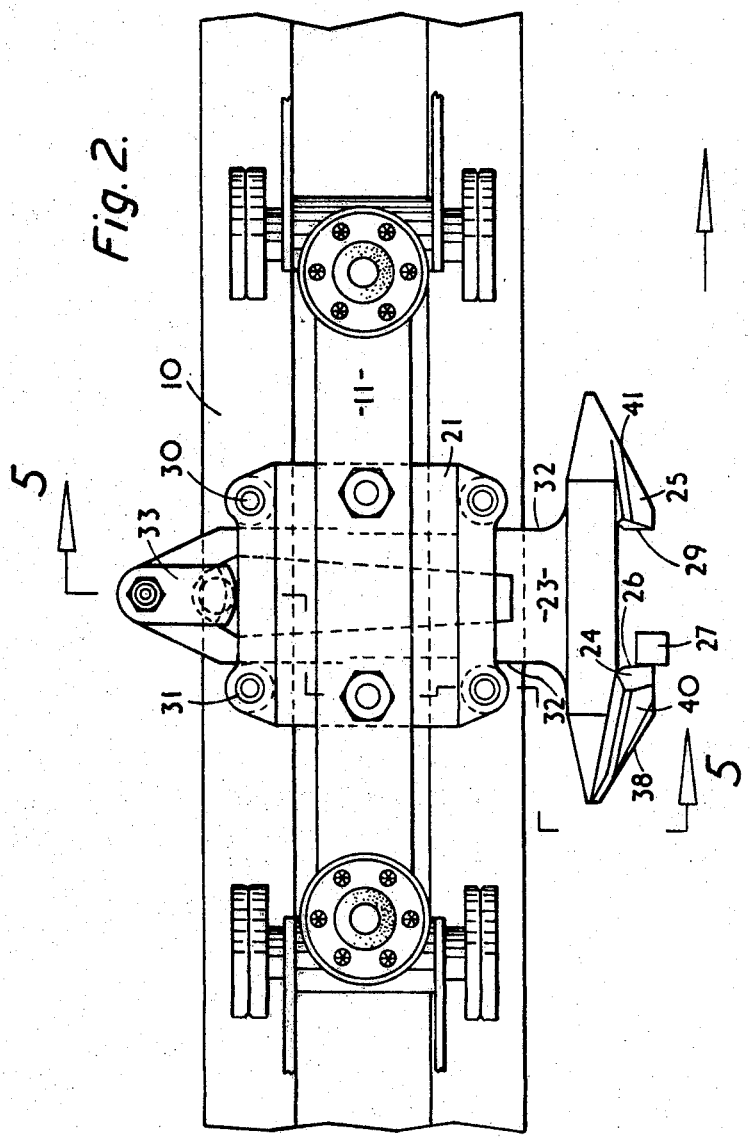

Nov. 21, 1967 O. J. B. ORWIN 3,353,500
CONVEYORS FOR CONVEYING GOODS
Filed June 7, 1965 6 Sheets-Sheet 5

INVENTOR
OLAF JOHN BARCLAY ORWIN
by Kurt Kelman
Agent

Nov. 21, 1967     O. J. B. ORWIN     3,353,500

CONVEYORS FOR CONVEYING GOODS

Filed June 7, 1965     6 Sheets-Sheet 6

INVENTOR
OLAF JOHN BARCLAY ORWIN
BY
Kurt Kelman
Agent

United States Patent Office 3,353,500
Patented Nov. 21, 1967

3,353,500
CONVEYORS FOR CONVEYING GOODS
Olaf John Barclay Orwin, Quinton, Birmingham, England, assignor to Fisher & Ludlow Limited, Tipton, England, a company of Great Britain
Filed June 7, 1965, Ser. No. 461,695
Claims priority, application Great Britain, June 9, 1964, 23,773/64
5 Claims. (Cl. 104—172)

ABSTRACT OF THE DISCLOSURE

This invention relates to conveyors for conveying goods of the kind comprising two trolley supporting tracks, meeting at a junction point, a plurality of wheeled goods carrying trolleys advanceable along each track, a pair of conveyor elements associated one with each trolley track, and each provided at intervals along its length with trolley driving dogs.

This invention relates to conveyors for conveying goods, of the kind herein referring to as the kind specified, comprising two trolley supporting tracks, a plurality of wheeled goods carrying trolleys advanceable along each track, a pair of conveyor elements associated one with each trolley track, a power unit associated one with each conveyor element to drive the same and each conveyor element being provided at intervals along its length with driving dogs, each having a trolley driving face directed forwardly in relation to the trolley track, i.e. directed in the designed direction of trolley advancement, the trolley driving faces of the driving dogs being adapted to engage with driving abutments provided one on each trolley to advance the same along the track, the two trolley tracks meeting at a junction point, the arrangement being such that trolleys advancing on one track under the control of one of the two conveyor elements can be transferred at the junction point to the other of the two tracks to be advanced thereby under the control of the other of the two conveyor elements.

Hitherto in conveyors of the kind specified, in transferring the trolleys from the one trolley track to another it has been necessary carefully to synchronise the speeds of the two conveyor elements, an arrangement as more fully explained later, which calls for the provision of expensive synchronising gear. The provision of such synchronising gear is necessary in order to ensure that when a trolley driving abutment which is engaged by a driving dog on one conveyor element passes out of control thereof for engagement with the driving dog of the other conveyor elements, a driving dog of the latter will always be situated in a position immediately to the rear of the driving abutment of the trolley concerned so as to be in a position to engage therewith.

With a view to avoiding the necessity of providing the synchronising gear aforementioned I have in the specification of my prior patent application No. 318,901, filed Oct. 25, 1963, now Patent No. 3,242,874, described and claimed a construction of conveyor of the kind specified, in which the conveyor element associated with that trolley track which is adapted to receive trolleys from the other trolley track has its driving dogs mounted for angular movement about a transverse axis which is situated rearwardly of the forwardly directed trolley driving face of the dog, said angularly movable driving dogs at a position spaced rearwardly of their trolley driving faces being provided with a trolley engaging face directed rearwardly of the associated dog and adapted to be engaged by the driving abutment of a trolley which is advancing toward the dog from the rearward side thereof but at a rate faster than the rate of advancement of the dog itself, the arrangement being such that when a driving abutment of such faster moving trolley contacts said trolley engaging face, the associated driving dog is adapted to be moved angularly into a trolley receiving position by the pressure of the advancing trolley to permit of the trolley abutment moving forwardly relative to the dog into a position for engagement by the trolley driving face of the dog.

Such an arrangement necessitates in practice the provision in association with each driving dog aforementioned of a retarding dog for the purpose of preventing the trolleys overrunning their associated conveyor element, which retarding dog must with the arrangement described in the prior specification be mounted separately from the associated driven dog. Such separate mounting of the retarding dog is necessitated by the fact that the latter cannot be mounted for angular movement in the same direction as that of the driving dog as the retarding dog would not then be effective in preventing the aforementioned over-running of a trolley relative to its conveying element.

The present invention has for its object the provision of a conveyor of the kind specified which as in the case of the arrangement described in the prior specification enables the aforementioned synchronising gear to be dispensed with but which further permits of a simpler and less expensive construction of driving and retarding dog to be provided than is the case with the arrangement of the prior specification.

According to the present invention in association with each driving dog is a retarding dog spaced forwardly of the driving dog in the designed direction of advancement of a conveyor element, each driving dog and its associated retarding dog being both carried upon a common supporting body mounted for sliding movement relative to the associated conveyor element in a direction transverse to the length thereof, so as to permit of each driving dog together with its associated retarding dog being displaceable relative to the conveyor element from a trolley engaging to a trolley disengaging position, each driving dog being formed on its rearwardly directed side and on at least one of its two laterally directed sides respectively with a rearwardly and a laterally directed trolley engaging face, each of said trolley engaging faces being inclined to the direction of sliding movement of the driving dog with each face directed away from the direction of sliding movement of the driving dog into the trolley disengaged position, each retarding dog on its forwardly directed side being formed with a forwardly directed trolley driving abutment engaging face which in a rearward direction is inclined away from the direction of sliding movement of the retarding dog into the trolley disengaged position, the arrangement being such that in the event of a trolley advancing relatively towards the driving dog so as to bring the driving abutment of the trolley into engagement with the rear face or the lateral face of such driving dog the latter is slidden temporarily into its disengaged position to permit of the driving abutment of said trolley moving forwardly relative to the driving dog into a position for engagement by the trolley driving face of such dog.

Herein the expressions forward and rearward, forwardly and rearwardly, have reference to the designed direction of advancement of the trolleys along their associated trolley track.

The provision of these laterally directed inclined trolley engaging faces of the driving dogs is a most essential part of the present invention which is not disclosed in the prior specification. Without this provision it would not be possible for the driving dogs to be mounted for sliding movement and accordingly it would not then be possible for a common supporting body to be provided for both the driving and the retarding dogs with consequent simplification of the construction as compared with the arrangement of the prior specification.

Where the conveyor is so arranged that trolleys are required to be fed from a branch trolley track to a main trolley track the slidably mounted dogs in accordance with this invention may be provided only on the conveyor element associated with the main trolley track. Where the conveyor is so arranged that the trolleys are adapted to be diverted when required from a main trolley track to a branch trolley track the slidably mounted dogs may be provided only on the conveyor element which is associated with the branch trolley track.

In this case it may be sufficient to provide the laterally directed trolley engaging face at one lateral side of the driving dog.

Frequently however the branch trolley track is constituted by a track loop adapted at one end to receive trolleys from a second track such as a main trolley track and adapted at its other end to feed trolleys into the same main trolley track and under these circumstances both the driving and the retarding dogs on each of the two conveyor elements would be mounted and arranged in accordance with this invention since in this latter case the driving dogs on both conveyor elements may be required to engage with trolleys advancing faster than the driving dogs themselves.

In this last mentioned arrangement which would be the usual arrangement in practice, the laterally directed trolley engaging faces of the driving dogs would be provided at both lateral sides of each dog, a construction which also facilitates the ready interchangeability of a standard construction of driving dog in accordance with the specific requirements of the particular conveyor system.

Preferably each driving dog with its associated retarding dog is carried upon the lower end of a stem connected to both dogs and it is mounted for rectilinear sliding movement relative to the associated conveyor element, i.e. mounted for sliding movement in a vertical direction considering the conveyor element horizontal. Usually the arrangement will be such that each pair of dogs are raised from a lower operative position to an upper disengaged position, a construction which permits of the dogs returning gravitationally when the trolley driving abutment which is advancing faster than the conveyor chain has passed beneath the underside of the driving dog and is in a position intermediate the driving and retarding dogs.

The invention is illustrated in the accompanying drawings, wherein:

FIGURE 2 is a side elevation to an enlarged scale of part of the conveyor shown in FIGURE 1, showing one of the driving dogs and associated retarding dog each disposed in their trolley engaging position.

Figure 1:
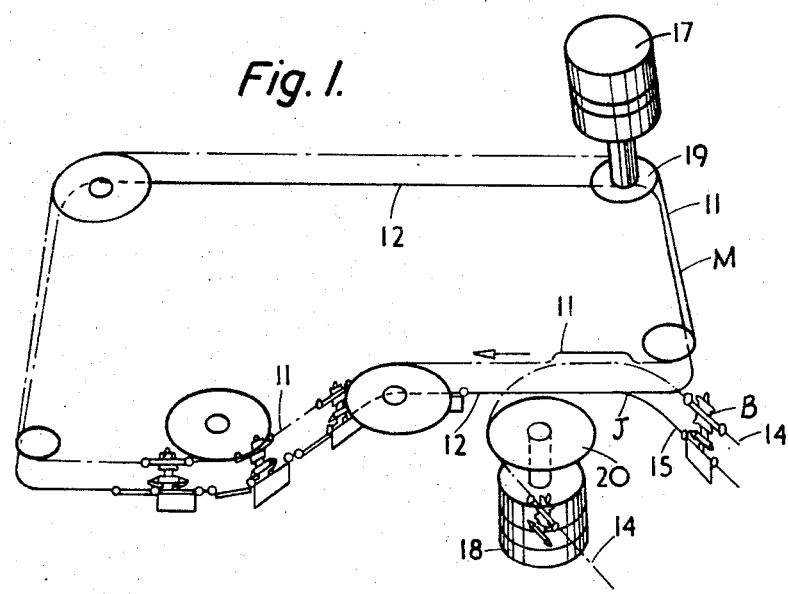
FIGURE 1 is a diagrammatic view of one form of conveyor of the kind specified, and embodying the present invention.
Figure 8:
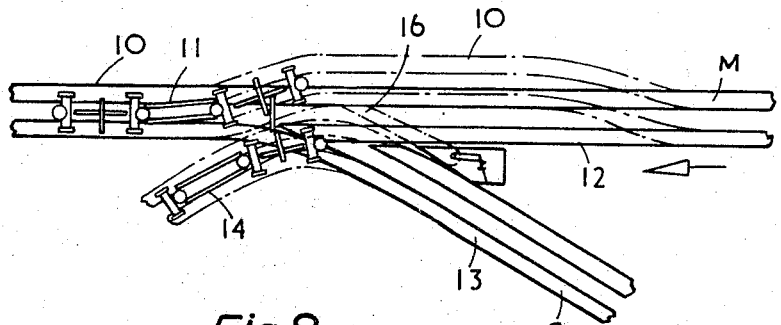
FIGURE 8 is a diagrammatic plan view showing the arrangement of the junction between the two trolley tracks, which junction is depicted diagrammatically at J in FIGURE 1.

Referring firstly to FIGURES 1 and 8 of the drawings the conveyor there illustrated comprises a main conveyor M and a branch conveyor B, and is of the general form described in my prior specification aforementioned.

The main conveyor M comprises a track 10 for a main conveyor chain 11 of endless configuration beneath which main chain track 10 is disposed a main trolley track 12 also of endless configuration.

The branch conveyor B is provided with a branch trolley track 13, the branch track 13 being provided with its own branch conveyor chain 14 also of endless configuration supported from branch chain track 15, the latter and the branch chain 14 being depicted diagrammatically, except at the junction point J between the two tracks 12, 13.

At the junction point J between the two tracks there is provided a movable switch tongue 16 of known form so that trolleys advancing in the designed direction indicated by the arrows in FIGURES 1 and 8 can be fed in from the branch track 13 or allowed to advance along the main track 12 in the known manner.

The two chains 11, 14 are each driven from their own power source 17, 18 respectively, through driving sprockets 19, 20, and by reason of the present invention as will later be herein made apparent, no special provision is required to ensure that the two chains are driven at precisely the same speed as has hitherto been necessary, an arrangement calling for precise synchronisation of the two power sources, usually electric motors, the provision of which synchronisation means adds appreciably to the overall cost of the installation.

The two conveyor chains 11, 14, are each provided at intervals along their length with housings 21, each formed as a pair of substantially parallel transversely spaced plates 22, and between the two plates of each pair is mounted for vertical sliding movement a stem 23 on the lower end of which is mounted a driving dog 24 and retarding dog 25.

Figure 3:
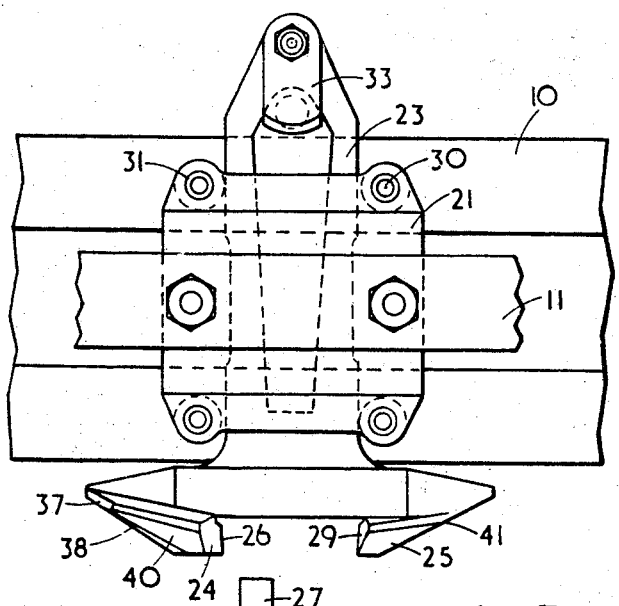
FIGURE 3 is a view similar to FIGURE 2, but showing the two dogs raised into a trolley disengaging position.

Each stem 23 accordingly constitutes a supporting body common to the two dogs 24, 25, mounted for sliding movement relative to the associated conveyor chain 11, 14, in a direction transverse to the length thereof, so as to permit of each driving dog 24, together with its associated retarding dog 25 being displaced relative to the associated conveyor chain 11, 14, from a trolley engaging position depicted in FIGURE 2 to a trolley disengaged position as depicted in FIGURE 3.

Each driving dog 24 which is disposed rearwardly of the stem 23 in relation to the retarding dog 25, has a forwardly directed trolley driving face 26 adapted to engage with a trolley driving abutment in the form of a transversely extending driving bar 27 disposed above and mounted upon each trolley 28. Each retarding dog 25 has a rearwardly directed face 29 which is engageable with the front face of each trolley driving bar 27 to prevent the trolleys overrunning the particular chain from which they are being driven.

The two plates 22 constituting each housing 21 are connected together at each of their corners by pins 30 carrying bushes 31 which engage with the adjacent vertical side 32 of the stem 23, so that this is guided for vertical sliding movement relative to the housing 21.

Downward movement of each stem relative to the housing 21 is limited by providing the upper end of each stem with a stop plate 33 adapted on its lower edge to abut against the upper edge of one of the housing plates 22.

Figure 4:
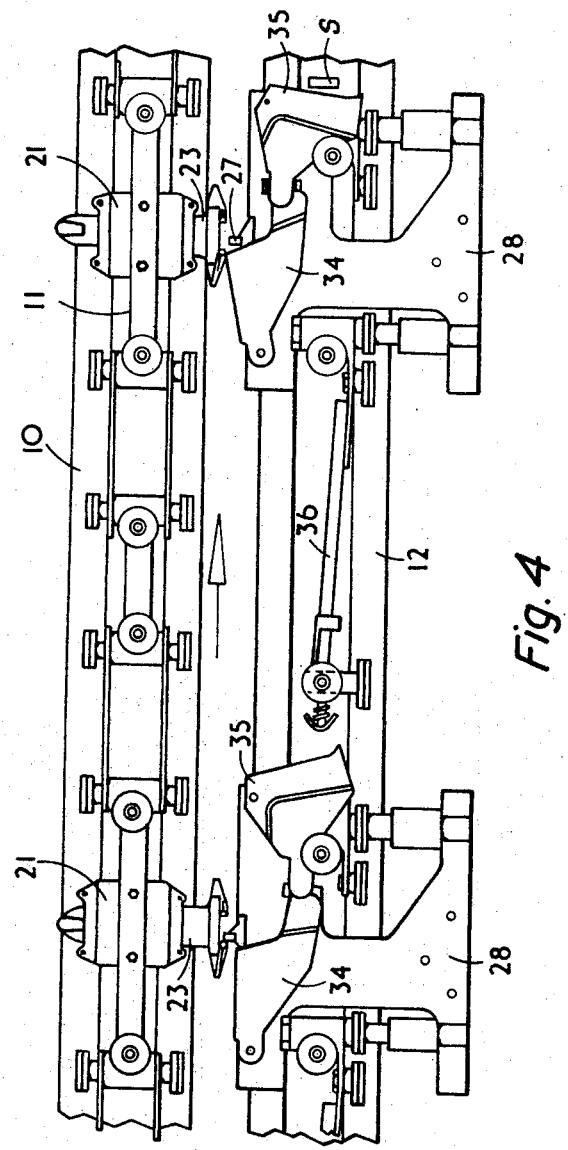
FIGURE 4 is a side elevation of part of the conveyor depicted in FIGURE 1, showing the manner in which the trolley driving dogs are displaced from their trolley engaging to their trolley disengaging position.

Displacement of each stem with its associated driving dog 24 into the trolley disengaged position may be effected by the arrangement illustrated in FIGURE 4, in which each trolley 28 has pivoted thereto a dog lifting member 34 operatively engaged with a striker member 35 provided at the front end of each trolley, each striker member 35 being engageable either with a displaceable stop S in the trolley track 12 at some predetermined position along its length, or with the rear end of a stem 36 extending rearwardly from each trolley, the arrangement serving to disconnect the drive from the conveyor chain to the second of two successively advancing trolleys, as this advances to within less than a predetermined distance from a preceding trolley, with both trolleys advancing in the direction of the arrow in FIGURE 4.

Figure 6:
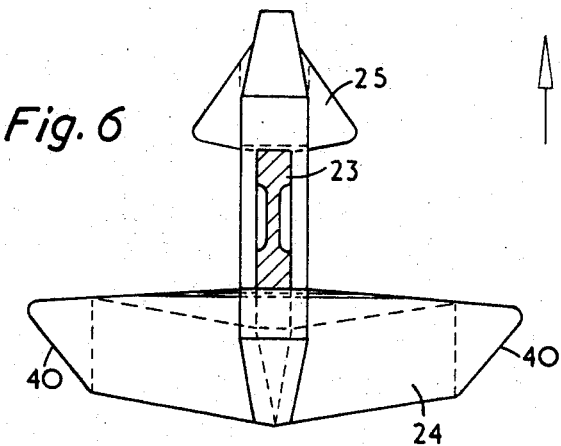
FIGURE 6 is a sectional view on the line 6—6 of FIGURE 5.

Referring now more particularly to FIGURE 6, it will be seen that each driving dog 24 has an overall dimension laterally of the associated chain track, which is substantially greater than that of the retarding dog 25.

Figure 7:
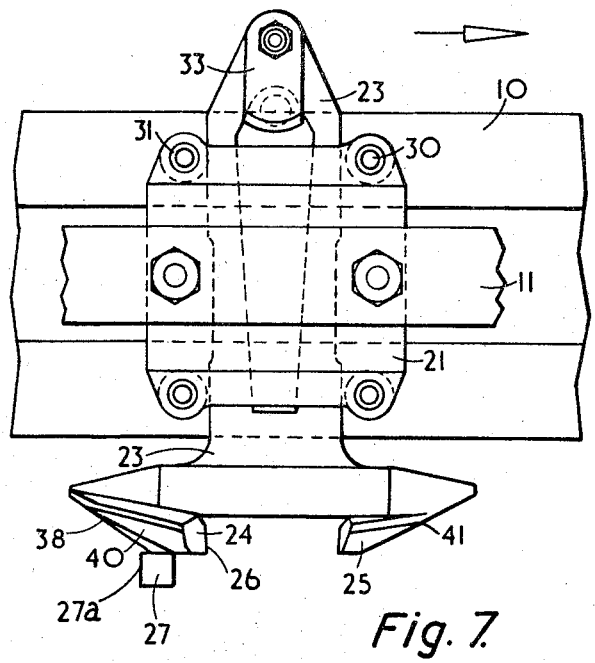
FIGURE 7 is a view similar to FIGURE 3, but showing the position occupied by a driving dog when engaged by a trolley advancing from the rearward side thereof.

Each driving dog 24 has its rear side 37 formed with a rear trolley driving abutment engaging face 38 which is inclined to the direction of sliding movement of the driving dog 24 from the trolley engaged to the trolley disengaged positions aforementioned, with such face 38 directed away from the direction of sliding movement of stem 23 into the disengaged position and this rear face 38 is designed to engage with the driving abutment, i.e. bar 27 of a trolley moving faster than the conveyor chain in the direction of the arrow in FIGURES 2 to 4 as shown in FIGURE 7, to effect lifting of the driving dog 24 and its associated stem 23 and permit of the trolley driving bar 27 advancing beneath the underside of the driving dog into a position in which the driving face 26 of the driving dog 24 is adapted to engage with the rearwardly directed driving face 27a of the trolley driving bar 27 in which position the driving dog with its associated stem walls gravitationally into the trolley engaging, i.e. driving position.

Figure 10:
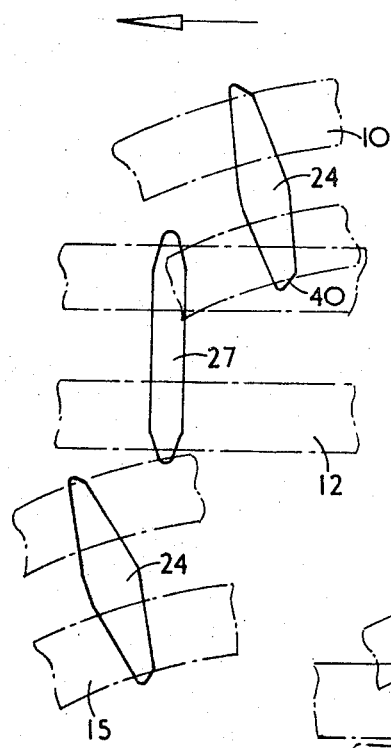
FIGURES 9 and 10 are plan views of part of the driving dogs illustrating diagrammatically two successive stages in the transference of a trolley driving abutment from a driving dog of one conveyor chain to a driving dog of the other of the two conveyor chains depicted in FIGURE 8 as the trolley is transferred from one to the other of the two tracks also depicted in FIGURE 8.

Also in accordance with the present invention each of the lateral sides 39 of each driving dog 24 is formed with a laterally directed trolley driving bar engaging face 40. This face 40 is inclined in a rearward direction towards a vertical plane passing through the centre of the conveyor chain and stem 23 to facilitate lateral engagement with the driving bar 27 of a relatively laterally advancing trolley adjacent a junction between two trolley tracks in the manner shown in FIGURES 8 to 10, and in particular FIGURE 9; i.e. with the driving bar 27 moving in the direction of arrow B in FIGURE 5 relative to dog 24.

Figure 6A:
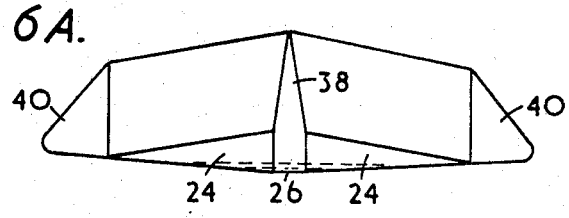
FIGURE 6A is an inverted plan view of part of what is shown in FIGURE 6.

However, in accordance with the present invention each of these laterally directed faces 40 as shown in FIGURES 6 and 6a are further inclined to the direction of vertical sliding movement of the stem 23 with each such face 40 directed away from the direction of sliding movement of the driving dog 24 into the trolley disengaged position.

Figure 5:
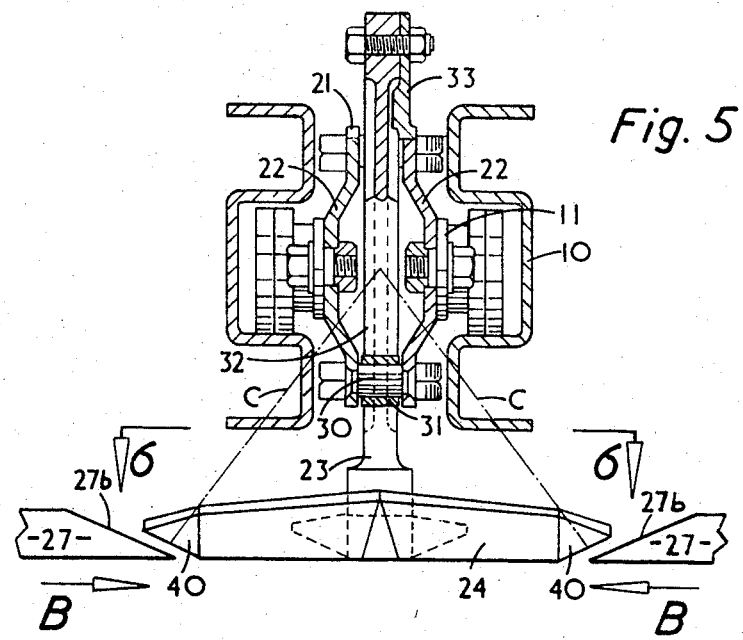
FIGURE 5 is a cross sectional view on the line 5—5 of FIGURE 2.

As shown in FIGURE 5 a correspondingly inclined upwardly directed driving dog engaging face 27b is provided on each end of each trolley driving bar 27.

Figure 9:
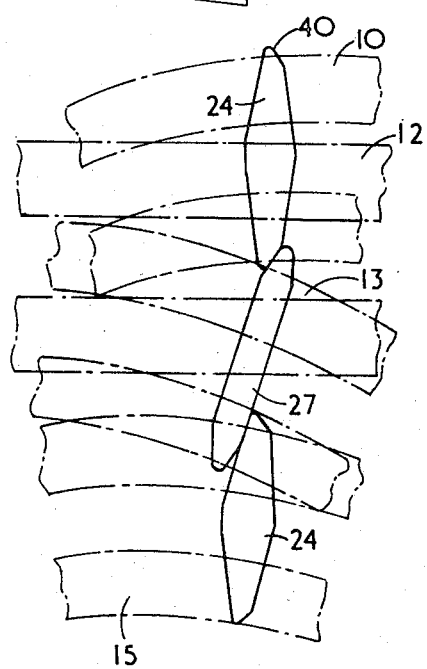

The arrangement is accordingly such that when as shown in FIGURE 9 of the drawing, of the prior specification one of these trolley driving bars 27 advances laterally towards one or the other of the two laterally directed faces 40 of the driving dog 24, the upwardly directed correspondingly inclined end face 27b of the driving bar 27 engages the adjacent laterally face 40 of the driving dog 24 so as to cause the driving dog with its associated stem 23 to slide upwardly and permit of the trolley driving bar 27 moving laterally as well as forwardly relative to the driving dog 24 into a position in which the driving bar ultimately is disposed wholly forwardly of the driving dog face 26 whereupon the driving dog 24 with its associated stem 23 will slide downwardly into driving engagement with the trolley abutment 27.

Thus, even in the event of there being absolute identity in speed between the trolley and the conveyor chain towards which the trolley is advancing into engagement, should the trolley initially engage with a driving dog 24 in a purely lateral direction, the provision of the inclined lateral face 40 at each lateral side of the driving dog effectively ensures that the driving dog 24 is lifted to permit of the trolley continuing to advance in a lateral direction towards the path of advancement of such driving dog.

Each trolley retarding dog 25 is provided on the forward side thereof with a forwardly directed trolley bar engaging face 41 which is inclined downwardly in a rearward direction away from the direction of movement of the trolley stem 23 into the trolley disengaged position, the arrangement being such that in the event of the conveyor chain overrunning a trolley, this inclined face 41 of the retarding dog 25 will engage with the trolley driving bar 27, thereby lifting the dog 25 together with the stem 23 and the associated driving dog 24 to the extent necessary, to permit the trolley driving bar 27 being received within the space between the two dogs 24, 25 and being engaged by the driving dog 24.

The trolley driving face 26 of the driving dog 24 and also the corresponding retarding face 29 of retarding dog 25 are each oppositely inclined to the vertical so that each of these faces are inclined downwardly towards a vertical plane passing through the centre of item 23 perpendicularly transverse to the direction of conveyor chain advancement.

Such inclination is purposely provided so as to ensure despite any imperfections in manufacture or assembly that there is no possibility of the pressure between either dog 24, 25 and the trolley driving bar 27 producing any resultant force tending to raise the dogs undesirably into their disengaged position.

The angle of inclination to the horizontal of each lateral driving dog face 40 and of the corresponding face 27b at each end of the trolley driving bar 27 is preferably of the order of 25°. The value of this angle is so chosen that referring to FIGURE 5 when face 27b of bar 27 engages with face 40 of driving dog 24, to lift the driving dog 24 with its associated stem 23 the resultant of the reaction of bar 27 on dog 24 acts substantially along the line C in FIG. 5, so as to pass substantially through the centre of the stem 23 at a position substantially medially betweeen the upper and lower edges of housing plates 22, with the result that the stem 23 does not tend to bind against the adjacent faces of the housing plates 22, as it is raised into the trolley disengaged position by the aforementioned engagement between bar face 27b and driving dog face 40.

What I claim then is:

1. A conveyor of the kind specified characterized that in association with each driving dog is a retarding dog spaced forwardly of the driving dog in the designed direction of advancement of a conveyor element, each driving dog and its associated retarding dog being both carried upon a common supporting body mounted for sliding movement relative to the associated conveyor element in a direction transverse to the length thereof, so as to permit of each driving dog together with its associated retarding dog being displaceable relative to the conveyor element from a trolley engaging to a trolley disengaging position, each driving dog being formed on its rearwardly directed side and on at least one of its two laterally directed sides respectively with a rear trolley engaging face and a lateral trolley engaging face, each of said trolley engaging faces being inclined to the direction of sliding movement of the driving dog with each face directed away from the direction of sliding movement of the driving dog into the trolley disengaged position, each retarding dog on its forwardly directed side being formed with a forwardly directed trolley driving abutment engaging face which in a rearward direction is inclined away from the direction of sliding movement of the retarding dog into the trolley disengaged position, the arrangement being such that in the event of a trolley advancing relatively towards the driving dog so as to bring the driving abutment of the trolley into engagement with the rear face or the lateral face of such driving dog the latter is slidden temporarily into its disengaged position to permit of the driving abutment of said trolley moving forwardly relative to the driving dog into a position for engagement by the trolley driving face of such dog.

2. A conveyor according to claim 1 and wherein each conveyor element is disposed above the associated trolley track, characterised in that each slidably mounted dog carrying supporting body is constructed as a stem mounted for vertical sliding movement in relation to the associated conveyor element considering the latter horizontal, so that each stem is vertically slidable between a lower trolley engaging position and a raised trolley disengaging position.

3. A conveyor according to claim 2 further characterised in that each stem is mounted for vertical movement between a pair of guide plates mounted at intervals along the length of the associated conveyor element, each stem at its upper end being provided with a stop portion adapted to engage with the upper edge of one of the two guide plates for the purpose of limiting the downward movement of the stem relative to the conveyor element.

4. A conveyor according to claim 3 characterised in that each of said lateral trolley engaging faces is so inclined to the direction of sliding movement of the associated driving dog that a force applied to said face acting normally thereon in a direction to displace the driving dog towards the trolley disengaging position passes through the stem at a position substantially medially between the upper and lower edges of the stem guiding plates.

5. A conveyor according to claim 2 and wherein each of the trolley driving abutments comprises a driving bar disposed at the upper side of the trolley and extending transversely of the direction of advancement of the trolley, characterised in that opposite ends of each transversely extending driving bar are formed with driving dog engaging faces which are inclined downwardly in a direction towards the extremity of the driving bar, each of these inclined trolley driving bar faces being adapted to engage with a lateral trolley engaging face on a driving dog.

No references cited.

ARTHUR L. LA POINT, *Primary Examiner.*

D. F. WORTH, *Assistant Examiner.*